April 24, 1951 E. LABIN ET AL 2,549,826

MULTIPLEX ELECTRICAL PULSE COMMUNICATION SYSTEM

Filed Dec. 4, 1945 2 Sheets-Sheet 1

INVENTORS
EMILE LABIN
DONALD D. GRIEG

BY Percy P. Lantzy

ATTORNEY

April 24, 1951 E. LABIN ET AL 2,549,826

MULTIPLEX ELECTRICAL PULSE COMMUNICATION SYSTEM

Filed Dec. 4, 1945 2 Sheets-Sheet 2

INVENTORS
EMILE LABIN
DONALD D. GRIEG

BY Percy P. Lantzy

ATTORNEY

Patented Apr. 24, 1951

2,549,826

UNITED STATES PATENT OFFICE 2,549,826

MULTIPLEX ELECTRICAL PULSE COMMUNICATION SYSTEM

Emile Labin, New York, and Donald D. Grieg, Forest Hills, N. Y., assignors to Federal Telephone and Radio Corporation, New York, N. Y., a corporation of Delaware Application December 4, 1945, Serial No. 632,731

5 Claims. (Cl. 179—15)

This invention relates to a multichannel communication system. More particularly it deals with a method and apparatus for multiplexing a plurality of signal channels on a single electromagnetic pulse wave wherein the pulses of at least one group of channels are at a different frequency or repetition rate than those of another group of channels. Specifically, in the transmission of a plurality of messages, of different character some require a wider frequency band than others, and one of the channels for transmitting signals of a wider frequency band may be sub-divided for the transmission of two or more signal channels of a lower frequency band. For example, an audio channel requiring, say, ten thousand pulses per second may be divided into ten channels for telegraph signals which require, say, only one thousand pulses per second, that is, every tenth pulse of one audio channel would form one telegraph channel.

It is an object of this invention to produce in a novel and effective manner a multichannel wave wherein two or more of the channels contain trains of pulses of different frequencies.

Another object is to transmit in a novel and effective manner a plurality of telegraph and audio signal channels on a single pulse wave.

It is another object to provide means for carrying out the above objects.

Still other objects will appear from time to time in the description which follows:

Generally speaking, the system of this invention comprises the steps of (1) producing at least two groups of signal modulated pulse trains wherein the trains of one group comprise pulses of a different frequency than do the trains of another group, and (2) interleaving the trains of all the groups to produce a single multichannel pulse wave. The modulation and interleaving of the pulse trains of each different channel of one group may be carried out simultaneously in a cathode ray device similar to that disclosed in our copending applications, Ser. No. 567,414, filed December 9, 1944, now Patent No. 2,495,738, granted January 31, 1950; and Ser. No. 591,065, filed April 30, 1945, now Patent No. 2,429,631, granted October 28, 1947. The interleaving or combination of the trains of pulses of signal channels of one group with those of another may comprise the replacement of one or more trains of one group with one or more other groups.

The single multichannel modulated pulse wave produced in this manner may be transmitted and received over any suitable communication system, such as by wire or radio or the like and the resulting received signal modulated multichannel pulse wave may be separated and demodulated in a plurality of cathode ray devices, one for each group of channels similar to those devices disclosed in our copending applications, Ser. No. 565,152, filed November 25, 1944, now Patent No. 2,465,380, granted March 29, 1949; and Ser. No. 614,078, filed September 1, 1945, now Patent No. 2,513,335, granted July 4, 1950.

These and other features and objects of the invention will become more apparent upon consideration of the following detailed description of an embodiment of the invention to be read in connection with the accompanying drawings in which.

Figure 1:
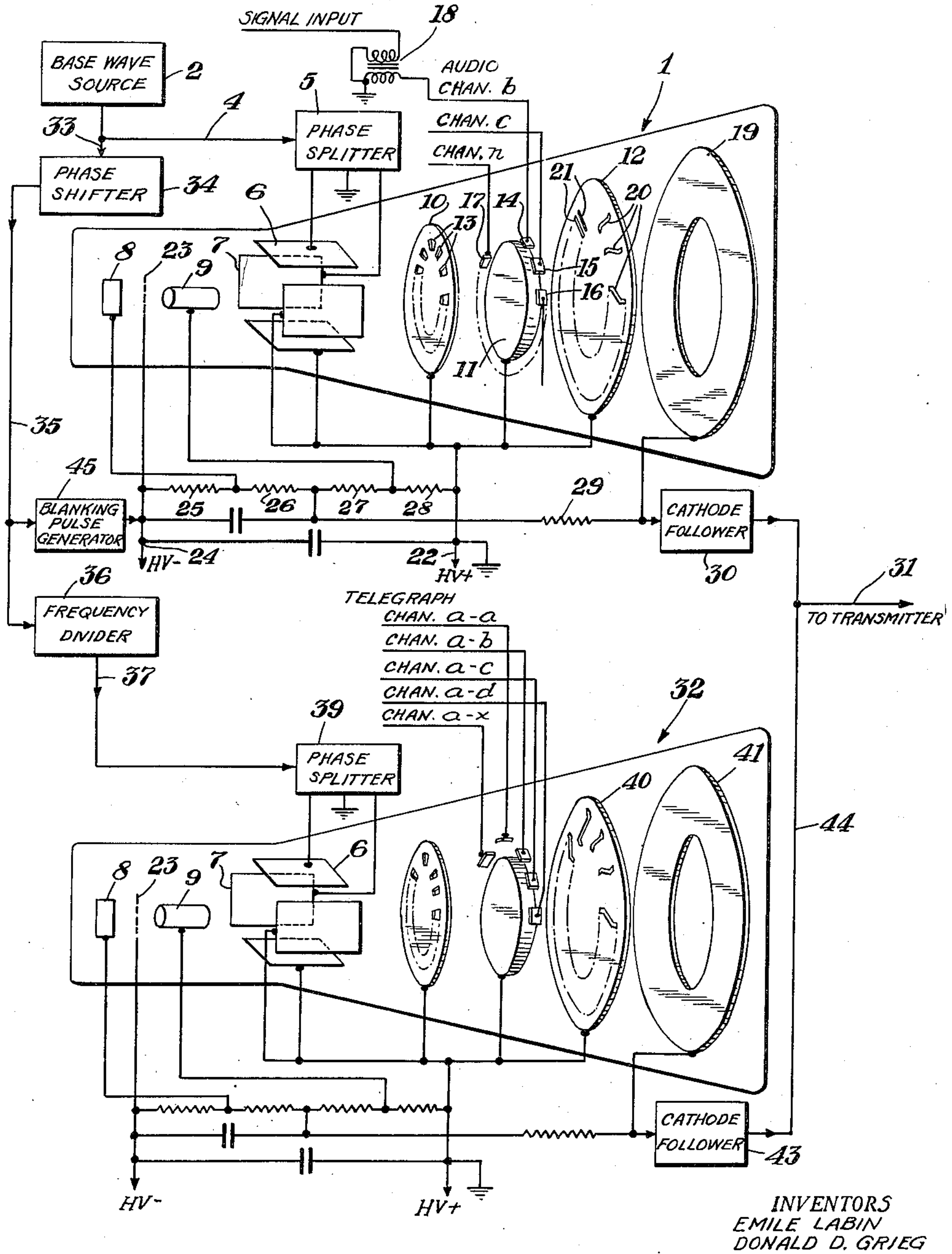
Fig. 1 is a schematic wiring diagram partially in block of one system for producing a multichannel pulse wave of this invention.
Figure 2:
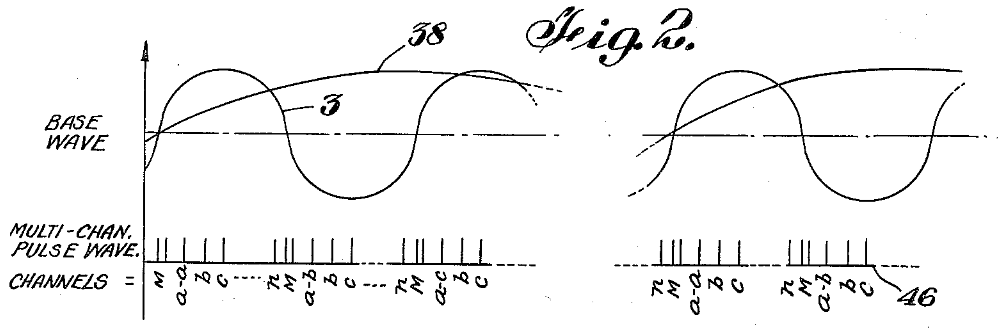
Fig. 2 is a graph of wave forms useful in describing the operation of the system of Fig. 1.

Referring to Figs. 1 and 2, there is shown a system for producing a multichannel pulse-time-modulated wave containing two groups of signal channels; one group of channels having a wide frequency band, viz., *a*, *b*, *c*, *d*, . . . *n* and a synchronizing channel M, and the other group of channels having a narrower frequency band, viz., *a—a*, *a—b*, *a—c* . . . *a—x*, which latter group replaces channel *a* of a first group.

Referring more particularly to Fig. 1, the cathode ray tube 1 produces and modulates one group of interleaved trains of time modulated pulses. This tube is controlled by a base wave 3, from the base wave source 2 which passes through line 4 to a phase splitter 5. From the phase splitter 5 are withdrawn two sine waves similar to 3, but 90° out of phase with each other, which waves are respectively applied to the vertical and horizontal deflecting plates 6 and 7 of the cathode ray tube 1. The changing potentials of these waves on plates 6 and 7 cause the electron beam, emitted from the cathode 8 and shaped by the anode 9, to rotate in a conical path around the inside of the tube 1 over the apertures in plates 10 and 12 and around the deflecting plate 11.

The commutator plate 10 comprises a series of apertures 13 for dividing the beam into sectors or "spurts" which are shaped by the radii of the plate 10.

The circular electrode 11 is provided with a series of smaller electrodes 14, 15, 16—17 spaced about its periphery so that successive beam sectors passing through apertures 13 may pass between them and the central electrode 11. Thus, when signal energy from one of the channels *b*, *c*, *d* . . . *n* is applied to its corresponding smaller electrode, the beam sector passing between that electrode and the electrode 11 will be deflected an amount proportional the amount of said applied signal energy. The signal energy of each channel may be stepped up by the transformer, such as 18, shown for channel *b*, before being applied to its corresponding smaller deflecting electrode.

The target electrodes for producing the time modulated pulse trains may comprise a modulator plate 12 and a secondary electron emission plate 19. The potential of the plate 12 is higher than the ring-shaped plate 19 so that when electrons impinge upon the plate 19, the ring emits electrons which flow to the plate 12. The plate 12 is provided with narrow slots 20 (one for each signal channel) for passage of the electron beam for impingement upon the plate 19. The central portions of the slots are disposed at acute angles with respect to the direction of the signal deflections produced by the potential differences between the small deflecting electrodes 14, 15, 16—17 and the electrode 11. This causes the beam sectors which are deflected to pass over these slots at a later time thereby producing pulses correspondingly time displaced from a given no-deflection position established by the market pulses M described below. A more detailed description of this modulation may be had in the above-mentioned copending application, Ser. No. 567,414, filed December 9, 1944. The end portions of the slots, however, are disposed parallel to the direction of signal deflection to limit the amount of time modulation and to prevent cross-talk between two adjacent channels.

The pair of parallel slots 21 in the plate 12 produce a pair of closely spaced pulses of short duration for the synchronizing channel signal. Since the synchronizing channel pair of pulses M are not modulated, it is not necessary to provide a small deflecting electrode adjacent electrode 11, corresponding to the position of the slots 21.

The potential applied to the different electrodes 6, 7, 10, 11, 12 is the same as indicated at 22. The grid 23, between the cathode 8 and the anode 9, is provided with a high negative potential by the connection 24, while the cathode 8 is provided with a less negative potential by the interposition of a resistance 25. By means of the resistors 26 and 27, the anode 9 is provided with a more positive potential than that of the cathode 8. By means of the interposed resistors 28 and 29 the anode target ring 19 is provided with a less positive potential than that of the modulating plate 12. The output of the circuit elements 12 and 19 is applied to a cathode follower 30, the output energy of which is withdrawn through line 31 to utilization circuits, such as a frequency modulator (not shown) for transmission of said wave.

In the particular embodiment disclosed, one of the channels, namely channel *a* of the first group produced in the cathode ray device 1, is sub-divided into a number of channels of lower frequency *a—a*, *a—b*, *a—c*, *a—d*, . . . *a—x*. These channels may be selectively modulated in a cathode ray device 32, similar to 1, but operated at a lower sub-multiple frequency. In order to synchronize the operation of the device 32 with the operation of the device 1, the original wave 3 from the base wave source 2 may be passed through line 33 to a phase shifter 34. From the phase shifter 34, the delayed wave 3 is passed through line 35 to a frequency divider 36 from which is withdrawn, through line 37, the wave 38 (shown in Fig. 2) having a frequency which is an even sub-multiple of the frequency of wave 3. This newly produced wave 38 is then passed to a phase splitter 39, similar to 5, for rotation of the electron beam in the tube 32, at a rate corresponding to the difference in frequency between the waves 3 and 38. Thus, for example, the beam in the device of Fig. 1 is making one rotation while the beam in the device 32 is passing from one channel position to the next, or $1/x$ rotations of that of the beam in device 1, wherein $x$ is the number of channels in the second group produced in device 32.

The electrodes in the device 32 are coupled similarly to those in device 1 and may produce time modulated pulses in the same manner as that described for the device 1. Thus, a series of time modulated pulses may be withdrawn from the modulating plate 40 and secondary electron emission plate 41 to the cathode follower 43. Thence, pulses are passed through line 44 to be combined and interleaved with the pulses from the cathode follower 30. The resulting combined wave may then be withdrawn thru line 31 for utilization, such as to a transmitter.

In order to prevent pulses from being produced in the position for channel *a* in the first group of device 1, blanking pulse generator 45 is provided which may be operated by the delayed wave 3 passing through line 35. This generator 45 applies a potential to the grid 23 of device 1 sufficient to cut-off the beam for the interval that channel *a* pulses would be produced, and thereby provides a space in the trains of interleaved pulses produced in the device 1, which space is filled by the pulses produced in the device 32. In place of this blanking generator the multiplexing device 1 may be operated with the sub-multiplexing aperture blank so that no pulse signal is formed for this particular aperture.

The devices 1 and 32 which produce separate groups of modulated pulse trains also simultaneously interleave the trains in each group. This is carried out by rotating the electron beam successively past the apertures in the electrodes 10 and modulating plates 12 and 40. The combined groups of pulse trains carrying the signal channels of two different frequencies form a multichannel pulse wave similar to wave 46 shown in Fig. 2. Below the pulses on wave 46 are written the symbols of the different channels carried by the wave.

Figure 3:
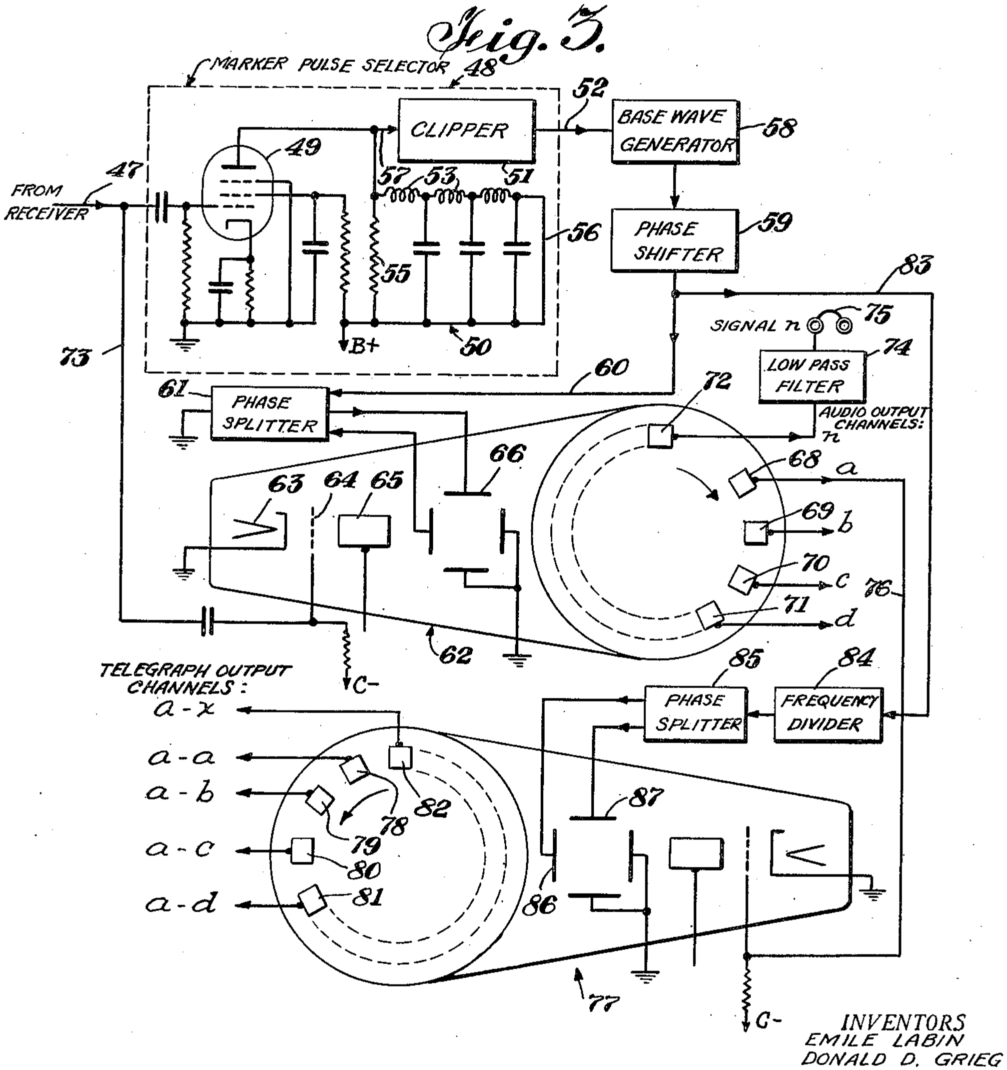
Fig. 3 is a wiring diagram partially in block of a system for separating and demodulating a multichannel pulse wave of the type produced in the system of Fig. 1.

An embodiment of a system for demodulating the multichannel pulse wave 46 produced in the system of Fig. 1 is shown in Fig. 3. In this demodulating system the wave 46 is received over line 47 and is first applied to the marker pulse selector circuit 48. This selector circuit may comprise a decoupler tube 49, a reflecting delay line 50, and a clipper 51, from which is withdrawn through line 52 a pulse wave having the frequency of the pairs of marker pulses M on the wave 46. The reflecting delay circuit 50 comprises an open-ended delay line consisting of a network of inductances and condensers 53 and 54, respectively. Across one end of the delay line is a balanced impedance 55 to prevent further reflections of the reflected pulse wave 46. The opposite end 56 of the network 50 is open to prevent inversion of the reflected wave. The time delay in the network 50 is sufficient to cause the first of the pair of marker pulses M of the reflected wave to be superimposed upon the second of the pair of marker pulses from the original wave, so that a combined pulse wave is produced having double the amplitude of pulses M. The resulting combined wave is withdrawn from the delay network through line 57 to the clipper 51 which segregates the marker pulses on the wave 46. The resulting separated marker pulse wave may then be passed into a phase shifter 59 to coordinate the control of the channel separation and demodulator device with the positions of the pulse trains on wave 46. The shifted wave is then passed through line 60 to a phase splitter 61 (similar to 5 shown in Fig. 1), for controlling the rotating sweep of the electron beam in the electron tube 62.

The tube 62 comprises a cathode 63, a control grid 64, a shaping anode 65, and vertical and horizontal deflecting plates 66 and 67, respectively. All of these electrodes are coupled (as is well known in the art of the cathode ray tubes) to produce a cathode ray beam having a circular sweep path.

At the end of the tube 62 opposite the cathode 63 is provided a series of separate targets 68, 69, 70, 71—72, corresponding respectively to signal channels *a, b, c, d . . . n.* The location of these targets 68, 69, 70, 71—72 corresponds to the time position of the different channels of the first group on wave 46. Received pulse wave 46 is passed over line 73 from line 47 to the grid 64 of the tube 62 to control the times when the beam may pass the other electrodes to the targets 68—72. Each pulse cuts on and off the beam emitted from cathode 63 to produce beam "spurts" of a duration equal to the duration of the pulse. The positions of these beam "spurts" correspond to the time displacement of their corresponding incoming pulses. The greater the time displacement of these incoming pulses, the longer the beam "spurts" are in contact with their corresponding targets, thereby producing output pulses of correspondingly greater amplitudes. The output pulse trains withdrawn from the respective targets 68—72 of tube 62 may be separately connected to low-pass filters, similar to 74 shown for channel *n*, from which may be obtained the reproduced signal *n* over device 75. There may be a blank space between the targets 68 and 72 corresponding to the position of the marker pulses M, which are not signal modulated and need not in the instant embodiment be received through the device 62.

The pulses of channel *a* received on target 68, comprise a second group of signal channels having a lower frequency, namely channels *a—a, a—b, a—c, a—d . . . a—x.* This second group of channels is withdrawn from target 68 through line 76 to another cathode ray device 77, similar to device 66 and having a similar group of targets numbered 78, 79, 80, 81 and 82, corresponding respectively to channels *a—a, a—b, a—c, a—d . . . a—x.*

The operation of the sweep circuit for rotating the beam in the tube 77 is controlled by the wave 3 which may be delayed in phase shifter 59 and then passed through line 83 to a frequency divider 84 from which is withdrawn a wave having the frequency of wave 38. This lower frequency wave is then passed to the phase splitter 85, similar to 61, for controlling the horizontal and vertical deflecting plates 86 and 87. If desired, the frequency divider may be at least partly incorporated in the tube 77 by increasing the number of targets therein, and the speed of rotation of the beam. Thus, the rotation of the beam in tube 77 may be $1/x$ that of the beam in tube 62, wherein $x$ is the number of channels in the second group. The rotations of the beams in tubes 62 and 77 may correspond identically to those in tubes 1 and 32, respectively.

If desired, other channels of the tubes 1 and 62 of the first group may be subdivided, modulated by signals of lower frequencies and demodulated in other tubes similar to tubes 32 and 77, respectively. Still further, channels of tubes 32 and 77 may be similarly sub-divided into other tubes, and so on, limited only by the necessary frequency of the lowest and narrowest frequency channel to be communicated. For example, if ten channels are provided on each tube of each group and the lowest frequency of the lowest channel is 100 cycles per second and the highest frequency of the tube of the first group is 1,000,000 cycles per second; then 100 divided by 1,000,000 or 10,000 separate channels of 100 cycles per second may be transmitted over a single wave having pulses of 1,000,000 cycles per second. In such a system there would be one group tube wherein each channel carried 1,000 separate channels; 10 groups of tubes in which each channel carried 100 separate sub-channels; 100 group tubes wherein each channel carried 10 sub-channels; and 1,000 group tubes wherein each channel carried one signal channel of 100 cycles per second.

Instead of the time displaced modulated pulses produced in the second group tube 32 (which may be employed to transmit telegraphic signals), the plate 40 may comprise apertures of such a shape and size that only "off" and "on" signals may be transmitted, where "off" corresponds to the space between the dots and dashes, and the duration of the "on" distinguishes between dots and dashes. Furthermore, the telegraph channels of tube 32 may be arranged for the transmission of Baudot's five unit telegraph code wherein five successive or separate targets are required for each signal channel.

The number of channels which may be produced and demodulated in any one tube is limited by the size of the cathode ray device, the character of sweep movement selected for the cathode ray beam therein, the maximum time displacement per channel, the guard intervals between pulses of adjacent channels, the widths of the pulses, and the widths of the frequency bands required to transmit the signals of the channels.

While the above is a description of the principles of this invention in connection with specific apparatus and particular modifications thereof, it is to be clearly understood that this description is made only by way of example and not as a limitation on the scope of the invention as defined in the accompanying claims.

We claim:

1. A multi-channel pulse communication system for signals having channels some of which include given frequency components which are to be transmitted and some of which have only relatively lower frequency components for transmission, comprising means for producing a plurality of successive groups of pulses each occupying a given time interval, means for modulating the corresponding pulses of each group according to the signals of one of said given frequency channels, means for modulating, according to the signals of one of said lower frequency channels, corresponding pulses of certain of said groups which said certain groups are spaced apart a given number of group intervals, and means for modulating, according to the signals of another of said lower frequency channels, pulses, corresponding in relative position to the lower frequency modulated pulses, of certain intermediate groups within said intervals which said certain intermediate groups are likewise spaced apart said given number of group intervals.

2. A multi-channel pulse signal communication system comprising a plurality of signal channels, means for producing a plurality of successive groups of pulses of given repetition rate in which the separate pulses within each group are modulated according to the signals of different channels, with the modulation of said pulses varying according to variations of the signal in their corresponding channels, means for producing separate groups of pulses having a pulse repetition rate equal to the aforesaid group repetition rate means for modulating different pulses in said separate groups according to the signal in separate additional channels, and means for interleaving said separate groups of pulses with the other groups of pulses so that a pulse of each of said separate groups appears in each one of the other groups.

3. A multichannel pulse communication system for signals some of which include given frequency components and some of which have only relatively lower frequency components to be transmitted, comprising a plurality of signal channels; means for producing a plurality of successive groups of pulses, means for modulating corresponding pulses of each group according to the signals in a separate one of a plurality of said given frequency channels and for modulating other corresponding pulses of each group according to the signals in another one of said plurality of given frequency channels, means for modulating corresponding pulses in succeeding groups each according to the signals in different ones of a plurality of lower frequency channels, and means for repeating said last mentioned modulation of pulses by the signals of the lower frequency channels at intervals at least as great as the period occupied by two successive groups of pulses.

4. In a time division multiplex communication system employing recurrent frames each of a plurality of channels, a first source of signals, means for modulating the respective channels of non-recurrent frames by signals from said first source, a second source of signals, means for modulating the same respective channels of said frames not modulated by signals from said first source, a third source of signals, and means for modulating another channel of each frame by signals from said third source.

5. In a time division multiplex communication system employing recurrent frames each of a plurality of pulses, a first source of signals, means for modulating the respective pulses of non-sequential frames by signals from said first source, a second source of signals, means for modulating by signals from said second source the same pulses of said non-sequential frames which are not modulated by signals from said first source, a third source of signals and means for modulating a single pulse of each frame by signals from said third source.

EMILE LABIN.
DONALD D. GRIEG.

REFERENCES CITED

The following references are of record in the file of this patent:

UNITED STATES PATENTS

| Number | Name | Date |
|---|---|---|
| 2,038,202 | Weis | Apr. 21, 1936 |
| 2,213,941 | Peterson | Sept. 3, 1940 |
| 2,256,336 | Beatty | Sept. 16, 1941 |
| 2,405,252 | Goldsmith | Aug. 6, 1946 |
| 2,427,500 | Houghton | Sept. 16, 1947 |
| 2,428,366 | Gilman | Oct. 7, 1947 |
| 2,429,616 | Grieg | Oct. 28, 1947 |
| 2,429,631 | Labin | Oct. 28, 1947 |
| 2,454,792 | Grieg | Nov. 30, 1948 |
| 2,462,860 | Grieg | Mar. 1, 1949 |